(12) United States Patent
Werdecker et al.

(10) Patent No.: US 6,660,671 B2
(45) Date of Patent: Dec. 9, 2003

(54) METHOD OF PRODUCING A COMPOSITE MATERIAL HAVING A HIGH SIO₂ CONTENT, COMPOSITE MATERIAL OBTAINED ACCORDING TO THE METHOD, AND PERMANENT MOLD MADE THEREOF

(75) Inventors: Waltraud Werdecker, Hanau (DE); Udo Gertig, Johannesberg (DE); Johann Leist, Altenstadt (DE); Rainer Koeppler, Seligenstadt (DE)

(73) Assignee: Heraeus Quarzglas GmbH & Co. KG., Hanau (DE)

( * ) Notice: Subject to any disclaimer, the term of this patent is extended or adjusted under 35 U.S.C. 154(b) by 79 days.

(21) Appl. No.: 10/103,660

(22) Filed: Mar. 21, 2002

(65) Prior Publication Data

US 2003/0119648 A1 Jun. 26, 2003

(30) Foreign Application Priority Data

Mar. 24, 2001 (DE) .......................... 101 14 484

(51) Int. Cl.⁷ .............................. C03C 1/00; C01B 33/12
(52) U.S. Cl. ........................................ 501/32; 423/335
(58) Field of Search ....................... 501/32, 54, 133, 501/154; 423/335–336

(56) References Cited

U.S. PATENT DOCUMENTS

| | | | | | |
|---|---|---|---|---|---|
| 4,978,640 A | * | 12/1990 | Kelly | ............................ | 501/32 |
| 5,707,440 A | * | 1/1998 | Hengchang et al. | ......... | 106/485 |
| 5,885,913 A | * | 3/1999 | Delcloy et al. | ................ | 501/54 |

* cited by examiner

Primary Examiner—David Sample
Assistant Examiner—Elizabeth A Bolden
(74) Attorney, Agent, or Firm—Tiajoloff & Kelly; Andrew L. Tiajoloff

(57) ABSTRACT

Composite material with high resistance to temperature changes and a high density, and having an SiO₂-containing matrix with quartz glass grains embedded therein is produced by preparing a suspension from a particle mixture of finely divided SiO₂ powder having at least two different particle fractions and of the quartz glass grains, forming a green compact and sintering the compact. The matrix has an SiO₂ content of at least 99% by wt. and is formed from at least first and second particle fractions, each of which is present as granules of nanoscale, amorphous, synthetically produced SiO₂ primary particles having a mean primary particle size of less than 100 nm. The composite material has an SiO₂-containing matrix with an SiO₂ content of at least 99% by wt. It is particularly suited for applications such as starting material for producing a permanent mold for melting solar silicon.

13 Claims, 1 Drawing Sheet

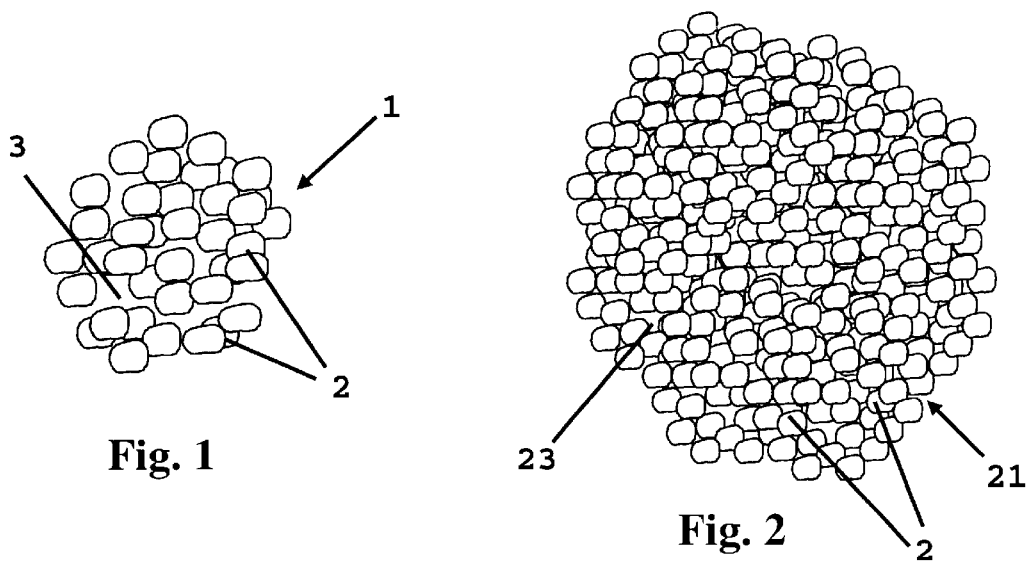
Fig. 1
Fig. 2
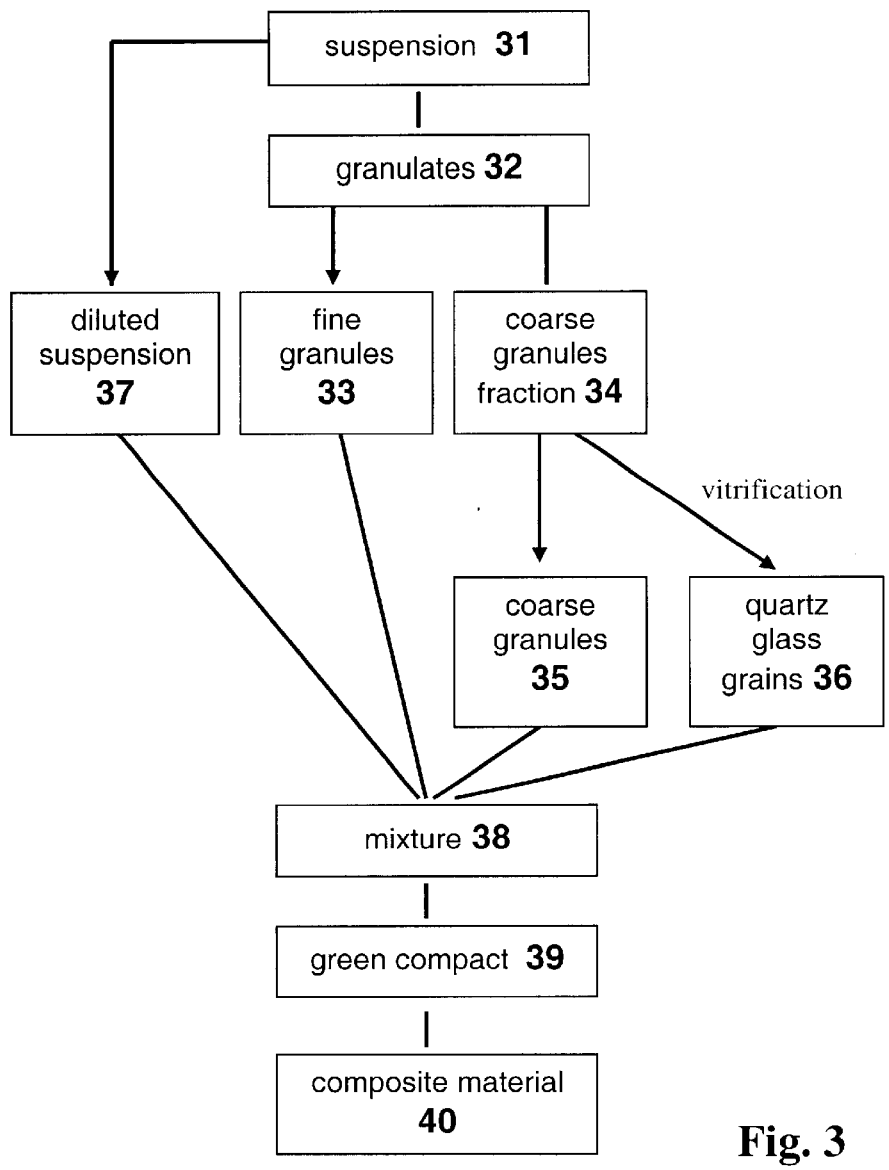
Fig. 3

METHOD OF PRODUCING A COMPOSITE MATERIAL HAVING A HIGH SiO₂ CONTENT, COMPOSITE MATERIAL OBTAINED ACCORDING TO THE METHOD, AND PERMANENT MOLD MADE THEREOF

The present invention relates to a method of producing a composite material having a high $SiO_2$ content, wherein quartz glass grains are embedded in an $SiO_2$-containing matrix, the method comprising the following steps: preparing a suspension from a particle mixture consisting of finely divided $SiO_2$ powder having at least two different particle fractions and of said quartz glass grains, forming the suspension into a green compact, and sintering the green compact.

Furthermore, the present invention relates to a composite material comprising an $SiO_2$-containing matrix in which glass grains are embedded.

Furthermore, the present invention relates to a permanent mold made of the composite material according to the invention.

Structural members consisting of a composite material having a high $SiO_2$ content of at least 99% by wt. are characterized by a small coefficient of expansion and by high chemical resistance. Such structural members are e.g. used in metallurgy, e.g. in the form of crucibles for melting metals, nozzles, protective tubes or pouring channels.

A composite material according to the above-mentioned type and a method for producing a refractory sintered article of silica glass is known from DE 693 06 169 (T2). This document describes a method in which two $SiO_2$ powders with different particle sizes are used as the starting materials having a binder phase for a further $SiO_2$-containing component in the form of coarse $SiO_2$ grains with a grain size between 40 μm and 1000 μm. The two more fine-grained $SiO_2$ powders are present, on the one hand, as quartz dust which is formed from substantially spherical particles, or as fine-grained $SiO_2$ particles of a particle size below 40 μm. These components are premixed in a dry-milling process, and a slip is then made therefrom under addition of a stabilizer. The weight percent of the individual components are, in the order of their above indication, 54% (coarse $SiO_2$ grains), 33% (fine-grained $SiO_2$ particles) and 13% (quartz dust). The slip is degassed under vacuum and cast into a plaster mold. The green compact produced thereby is dried and sintered in a furnace at 1050° C. to obtain the composite structural member. Coarse quartz glass grains which are embedded in a relatively continuous matrix of fine particles and of spherical particles of quartz dust are typical of the microstructure of the structural member. The structural member has an open porosity of 13%, and its density is at 1.91 g/cm³. The crystallographic analysis shows a cristobalite content of less than 2%.

On account of its open, i.e. continuous, porosity, the known composite material cannot be used in unlimited form for structural members in the case of which density or high purity are of importance. Metallic melts can penetrate into the wall of the structural member through the pores and result in leakage. In principle, a higher density and a lower porosity could be achieved through a higher sintering temperature or a longer sintering period, but an increased cristobalite formation would have to be accepted. The formation of cristobalite is caused by impurities of the starting components or by possible additives such as stabilizers and sintering adjuvants, and rapidly progresses at elevated temperatures. This, however, would entail a reduced resistance to temperature changes and a lower strength of the composite material.

It is therefore the object of the present invention to indicate a method which permits an inexpensive production of a composite material having a high $SiO_2$ content of at least 99% by wt. which is characterized by a high resistance to temperature changes together with a high density, and to provide a composite material which is suited for applications where temperature resistance, density and high purity are of importance, and to indicate a suitable use thereof.

As for the method, this object starting from the above-mentioned method is achieved according to the invention in that the matrix has an $SiO_2$ content of at least 99% by wt. and is formed from at least a first and a second particle fraction, each of said particle fractions being present as granules of nanoscale, amorphous, synthetically produced $SiO_2$ primary particles having a mean primary particle size of less than 100 nm.

For the preparation of the composite material, exclusive use is made of amorphous starting substances in the method according to the invention and also in the above-described known method, so that in the composite material the (vitreous) quartz glass grains are embedded in a matrix (binding phase) which also consists essentially of quartz glass. Due to the fact that the two essential components of the composite material, namely "matrix" and "quartz glass grains", consist of amorphous $SiO_2$, stresses caused by different coefficients of expansion are avoided. The matrix is formed from at least two different particle fractions which, in contrast to the known method, are each formed as granules of nanoscale, amorphous, synthetically produced $SiO_2$ primary particles.

The quartz glass grains serve as a filler. They are devoid of any open porosity and restrict shrinkage of the green compact during sintering. A closed porosity of the quartz glass grains is not detrimental to the method according to the invention and may be necessary, for instance for setting the desired opacity of the material.

The porosity of the composite material is essentially defined by the matrix. In the method according to the invention, the matrix is substantially formed by sinter-active components, as will be explained in more detail in the following. The use of at least two different particle fractions for forming the matrix permits a higher packing density in the green compact together with an optimization of density and strength of the composite material.

Said optimized condition is brought about by the particle fractions differing from one another, either in the size of the granules, their density or with respect to their sinterability; density and sinterability of the respective particle fraction are here substantially set by thermal pretreatment.

Due to the fact that at least the first particle fraction and the second particle fraction consist of granules formed from nanoscale, amorphous $SiO_2$ primary particles having a mean primary particle size of less than 100 nm, compaction and consolidation that are of advantage to the later sintering process are already observed in the green compact stage. This is due to a certain solubility and movability of the individual $SiO_2$ primary particles in the suspension, which contributes to the so-called "neck formation" between neighboring granules in the green compact. During drying of the $SiO_2$-enriched liquid phase in the area of the "necks", said necks consolidate, resulting in a firm connection of the individual granular particles and in a compaction and consolidation of the green compact which facilitate the subsequent sintering process and thus yield a relatively high density of the composite material, i.e. already at a low sintering temperature. The solubility of individual primary particles and of the granules formed therefrom in the suspension is the more pronounced the greater the specific surface of the granule is. These effects based on the nanoscale amorphous $SiO_2$ primary particles have a stabilizing influence on both the green compact and the composite material. Therefore, the method according to the invention makes it possible to form the green compact without the help of binders and stabilizers and permits a sintering of the composite material without the addition of sintering adjuvants. Thus, the impurities in the composite material that accompany the use of such an additive are avoided.

Hence, due to their high sintering activity, the nanoscale, amorphous $SiO_2$ primary particles contribute to a high density, mechanical strength and purity of the composite material.

This effect of the amorphous $SiO_2$ primary particles which is conducive to mechanical strength and density is intensified in that the method according to the invention allows a sintering of the green compact at a relatively high sintering temperature without start of a cristobalite formation impairing the strength of the composite material. This is due to the fact that the $SiO_2$ primary particles are produced synthetically, and the granules formed therefrom have correspondingly low contents of impurities. A low content of impurities, in turn, permits sintering at a high temperature without an ensuing devitrification, resulting in a composite material of a high density and strength. The purity of the granules is even enhanced by the fact that they can be produced without organic binders as are otherwise used in the preparation of granules. This is made possible by the above-described compaction and consolidation effect of the primary particles which is also observed in the production of granules.

Such primary particles are e.g. obtained by flame hydrolysis or oxidation of silicon compounds by hydrolysis according to the so-called sol-gel method or in a liquid. The finely divided primary particles obtained in this way are compacted by means of granulation methods, with granules being formed in the sense of the present invention by the agglomeration of the finely divided primary particles. Thus, the granules are a multiple of the size of a primary particle. The size of the primary particles is in the nanometer range, whereas that of the granules is normally within the micrometer range or above. It is possible to achieve impurity contents of Li, Na, K, Mg, Ca, Fe, Cu, Cr, Mn, Ti and Zr within the granules that amount to a total of less than 1 ppm by wt. Dopants that have intentionally been added are no impurities in this sense.

$SiO_2$ primary particles produced by flame hydrolysis of a silicon-containing starting compound have turned out to be particularly suited. Such $SiO_2$ primary particles are characterized by a particularly high purity and sintering activity so that their granulation can be carried out by means of known granulation methods without the addition of external binders because a binding effect at the contact points of individual primary particles is achieved by internal material through the above-explained sol-gel binding.

It has been found to be advantageous when use is made of a first particle fraction that has a specific BET surface area of at least 40 $m^2/g$. Such a relatively large BET surface area guarantees a high sintering activity of said granules (hereinafter also designated as "fine granules"), the mean particle size of which is typically below about 160 $\mu m$. The surface of the fine granules is composed of outer and inner surface, the latter being substantially defined by continuous pore channels which after the sintering process are present as closed pores and give the composite material an opaque appearance.

It has been found to be advantageous when the second particle fraction has a smaller specific BET surface area than the first particle fraction. Due to the smaller BET surface area, the second particle fraction shows reduced shrinkage during drying and sintering, so that dimensional stability and accuracy of the green compact are influenced by the addition of said particle fraction. The second particle fraction preferably shows a specific BET surface area of 35 $m^2/g$ or less. The second particle fraction comprises preferably coarser particles than the first particle fraction and can thus be consolidated by thermal treatment without any major problems. The mean particle size is normally above 200 $\mu m$ (said second particle fraction will also be designated as "coarse granules" in the following).

The first and second particle fractions are preferably obtained by granulation of nanoscale amorphous $SiO_2$ particles and subsequent thermal consolidation of the granules produced. The thermal consolidation of the granules produced in this way is carried out at a temperature ranging from 900° C. to 1450° C., with the proviso that the temperature during sintering of the first particle fraction is lower than during sintering of the second particle fraction.

The quartz glass grains have preferably a specific BET surface area of 1 $m^2/g$ or less. These are amorphous particles of synthetic $SiO_2$ or of natural raw material. The grains have either no continuous pores or have a small amount of continuous pores and do not contribute to any shrinkage of the green compact during drying and sintering. They serve mainly as a filler, but can also be selected with respect to a special effect on the physical or chemical properties of the composite material. For instance, for increasing the infrared transparency of the composite material, transparent grains are rather preferred, whereas bubble-containing grains have the opposite effect and give the composite material an opaque appearance. The particle size has no essential influence on the function of the quartz glass grains as "fillers", so that suitable grain sizes may range from 0.1 to 4 mm.

It has been found to be of advantage when use is made of a particle mixture that additionally comprises $SiO_2$ primary particles that are not agglomerated or only agglomerated to a slight degree and have a specific BET surface area of at least 40 $m^2/g$. The $SiO_2$ primary particles are substantially present in a non-agglomerated form. They have a binder-like effect in the green compact and enhance the density and mechanical strength of said compact by promoting neck formation during drying. Moreover, the addition of the primary particles has a positive effect on the sintering activity. The non-agglomerated $SiO_2$ primary particles are added to the particle mixture in addition to the above-described particle fractions and the quartz glass grains, and they are preferably added, as will be described in the following, as a suspension.

The composite material is preferably produced by the so-called slip casting method. A suspension is here produced from a liquid and at least a part of the $SiO_2$-containing starting components. The particle mixture can be homogenized in a particularly easy way if the $SiO_2$ primary particles are provided in a suspension, also in a slightly agglomerated form. The remaining starting components are then also introduced into the suspension and homogenized therein.

As for the composite material, the above-indicated object, starting from the composite material of the above-mentioned type, is achieved according to the invention in that the matrix comprises an $SiO_2$ content of at least 99% by wt.

The composite material according to the invention is characterized by a matrix having a high $SiO_2$ content of at least 99% by wt. The high $SiO_2$ content permits the production of the composite material by sintering a green compact at a relatively high sintering temperature or for a long sintering period without a pronounced cristobalite formation. A cristobalite formation would impair the resistance to temperature changes and the strength of the composite material. A high density and thus a small open porosity can however be set by choosing a high sintering temperature and/or long sintering duration.

The small impurity content of the matrix thus permits a sintering operation at a temperature which is high in comparison with the known method, and thus the production of a composite material having a high density, high resistance to temperature changes and high strength.

The density and mechanical strength of the composite material are substantially determined by the matrix. As has already been described with respect to the method according to the invention, the matrix is substantially formed from agglomerates of nanoscale, synthetically produced, amorphous $SiO_2$ primary particles which contribute to a high density and mechanical strength of the composite material solely by reason of their high sintering activity. Moreover, the degree of purity of the matrix is additionally enhanced because it can be produced without the addition of external, in particular alkali-containing, binders.

Moreover, the composite material according to the invention is characterized by a matrix which consists entirely of an amorphous phase. As a result, mechanical stresses between the matrix and the quartz glass grains embedded therein are avoided because matrix and quartz glass grains have the same coefficient of expansion.

It has been found that a composite material produced according to the method of the invention is particularly suited as a starting material for producing a permanent mold for melting solar silicon. Impermeability of the material to the silicon melt, and thus a high density, are imperative for this intended use; in addition, mechanical strength and temperature-change resistance of the permanent mold are required, said characteristics being obtained when the permanent mold is produced from a composite material as obtained according to the method of the invention.

The invention shall now be explained in more detail with reference to embodiments and a drawing, in which there is shown in detail in FIG. 1 a typical grain of a "fine granular material" obtained by wet granulation of $SiO_2$ primary particles, for use in the method according to the invention;

FIG. 2 a typical grain of a "coarse granular material" obtained by wet granulation of $SiO_2$ primary particles and thermal aftertreatment, for use in the method according to the invention; and FIG. 3 a flow chart for explaining a procedure for producing the composite material with the help of the method according to the invention.

Starting materials for the preparation of the composite material are:
 (a) "quartz glass grains" having a BET surface area of 1 $m^2/g$ and grain sizes ranging from 1 mm to 3 mm.
 (b) "fine granules" having a specific BET surface area of 45 $m^2/g$, the size of the granular grains being in a range below 160 $\mu$m,
 (c) "coarse granules" in the case of which a specific BET surface area of 20 $m^2/g$ and a tamped density of 1.4 $g/m^3$ have been set by thermal compaction at a temperature of 1200° C. in the rotary tubular furnace. The size of the granular grains of the "coarse granules" ranges from 200 $\mu$m to 500 $\mu$m, and
 (d) a suspension of slightly agglomerated "$SiO_2$ primary particles" having a specific BET surface area of more than 50 $m^2/g$ and a size of less than 100 nm.

First of all, the individual starting components and their preparation shall now be described in more detail with reference to embodiments:

The quartz glass grains consist of entirely vitrified $SiO_2$ which is, for example, obtained by preparing (comminuting and screening) synthetic quartz glass; preferably, however, by vitrification of "$SiO_2$ granules" prepared from pyrogenic $SiO_2$ primary particles, as will be described in more detail hereinafter.

Coarse granules and fine granules are present as agglomerates of amorphous pyrogenic $SiO_2$ primary particles produced by flame hydrolysis of $SiCl_4$. These are characterized in their non-agglomerated form by a large specific surface area (according to BET) of 60 $m^2/g$, the individual $SiO_2$ primary particles having a size of less than 100 nm. The standard granulation methods, such as wet granulation, spray granulation, centrifugal atomization or extrusion, are suited for preparing the granules In the case of wet granulation, an aqueous suspension of the $SiO_2$ primary particles is prepared, and moisture is removed therefrom under continuous stirring in a mixer until the suspension decomposes to form a grainy mass. After the drying process the specific surface area (according to BET) of the granules obtained in this way is 50 $m^2/g$, the spheroidal granular grains having a diameter ranging from about 100 $\mu$m to 1000 $\mu$m, the individual granular grains being present as an agglomerate of a multitude of $SiO_2$ primary particles.

The fine fraction of the wet granulation having a diameter of less than 160 $\mu$m is used either without any aftertreatment or after a slight thermal consolidation at a temperature of about 950° C. as "fine granules" for preparing the composite material. A single grain of the fine granules obtained in this way is schematically shown in FIG. 1. Grain 1 is present as a substantially spherical agglomerate of individual $SiO_2$ primary particles 2 at a diameter of about 150 $\mu$m. The $SiO_2$ primary particles 2 are shown on an enlarged scale in FIG. 1 for reasons of illustration; they have a diameter of about 50 nm. The agglomerate of the $SiO_2$ primary particles 2 is loose, so that it can be destroyed by slight mechanical pressure. Open pore channels 3 are formed between the $SiO_2$ primary particles 2. The "fine granules" have a specific BET surface area of about 45 $m^2/g$, the surface being substantially illustrated as an "inner surface" because of the inner continuous pore channels. Due to a slight thermal consolidation at a temperature of 950° C., the specific surface area is also reduced to about 38 $m^2/g$.

The coarser fraction of the above-mentioned wet granulation is thermally precompacted after drying by being subjected to a temperature treatment in a continuous furnace at a temperature of about 1200° C. in a chlorine-containing atmosphere under formation of the "coarse granules". The granules are simultaneously purified, a purification by means of chlorine being particularly efficient because the surface of the $SiO_2$ primary particles is accessible via the pore channels to the purifying gas and the gaseous impurities can be removed easily.

On the whole, the coarse granules are characterized by a specific BET surface area of 20 $m^2/g$ and a tamped density of 1.4 $g/m^3$. The mean grain diameter is at about 420 $\mu$m. After hot chlorination of the granules, the total content of the impurities of Li, Na, K, Mg, Ca, Fe, Cu, Cr, Mn, Ti, and Zr is less than 500 ppb by wt.

FIG. 2 is a schematic illustration showing a grain 21 of the thermally compacted "coarse granules". After the sintering process the individual $SiO_2$ primary particles 2 are intergrown to a slightly firmer degree due to so-called "neck formation". The pore channels found prior to sintering have largely disappeared, but closed fine pores 23 are present in a great number.

The preparation of the composite material according to the invention shall now be explained by way of example with reference to FIG. 3 using the starting components described above in more detail.

The composite material is produced by means of the so-called slip casting method. To this end a suspension 31 of 14 kg of an amorphous silicic acid dust with particle sizes of from 10 nm to 100 nm and a specific surface of about 70 $m^2/g$ is prepared with 17 kg of demineralized water and mixed in an Eirich mixer under gradual removal of moisture until the mixed material crumbles to form starting granules 32. The starting granules 32 produced in this way are flowable and free from binders and have a large particle size distribution with particles sizes of up to 4 mm. They have a great strength and can therefore be handled easily. They have a residual moisture of less than 24% by wt. After drying in a rotary tubular furnace the residual moisture is less than 1% by wt.

The fine fraction of the granules 32 below 160 μm is screened off and kept ready for further use as "fine granules" 33.

Part of the coarse fraction 34 (particle sizes above 160 μm) of the starting granules 32 is, as has been described above, compacted by temperature treatment in a continuous furnace at a temperature of about 1200° C. in a chlorine-containing atmosphere to form "coarse granules" 35.

A further part of the coarse fraction 34 is tightly sintered by a temperature treatment at temperatures above about 1350° C. in order to obtain the above-mentioned quartz glass grains 36. The specific surface is here reduced to values of less than 1 $m^2/g$. Alternatively, raw recycling material which has been prepared by comminution and screening and consists of synthetic quartz glass is used as quartz glass grains 36.

A diluted suspension 37 to which the remaining $SiO_2$ starting components (fine granules, coarse granules, quartz glass grains) are admixed and homogenized in a ball mill is prepared from part of the original suspension 31 by adding water. The weight percentages of the individual $SiO_2$ starting components in the homogeneous suspension 38 prepared in this way follow from Table 1:

TABLE 1

| Starting component | Percentage by weight |
|---|---|
| $SiO_2$ primary particles from diluted suspension 37 | 6 |
| fine granules 33 | 28 |
| coarse granules 35 | 20 |
| quartz glass grains | 46 |

Subsequently, a green compact is formed from the homogeneous suspension 38. Various methods are particularly suited therefor.

1. The suspension is cast into a diecasting mold of a commercial diecasting machine and dewatered via a porous plastic membrane under formation of a porous green compact 39.
2. The suspension is poured off into a plastic mold under addition of a gel-forming component, such as ammonium fluoride, and removed from the mold after consolidation as a green compact with a high content of water. A slow drying process is here required for avoiding cracks caused by the drying process.
3. A homogeneous suspension with a low moisture content is prepared, and said suspension has subsequently added thereto a gel-forming component, such as ammonium fluoride. This yields a tenacious mass which is pressed into a corresponding mold and solidified therein.

For the removal of bound water the green compact 39 is dried at about 200° C. in an aerated furnace and then sintered at a temperature of 1430° C. to obtain an opaque shaped body 40.

The composite material 40 obtained in this way comprises only closed pores; its density is 2.1 $g/cm^3$. The composite material 40 has no crystalline amounts and is therefore characterized by a high resistance to temperature changes and by excellent chemical resistance, in particular with respect to a silicon melt. The composite material is therefore predestinated for use as a permanent mold for melting solar silicon. On account of its high density the silicon melt does not penetrate into the wall of the permanent mold.

What is claimed is:

1. A method of producing a composite material having a high $SiO_2$ content, wherein quartz glass grains are embedded in an $SiO_2$-containing matrix, the method comprising the following steps:

preparing a suspension from a particle mixture consisting of finely divided $SiO_2$ powder having at least two different particle fractions and of said quartz glass grains;

forming said suspension into a green compact, and sintering said green compact, said matrix having an $SiO_2$ content of at least 99% by wt. and being formed from at least a first and a second particle fraction, each of said particle fractions being present as granules of nanoscale, amorphous, synthetically produced $SiO_2$ primary particles having a mean primary particle size of less than 100 nm.

2. The method according to claim 1, wherein said $SiO_2$ primary particles are produced by flame hydrolysis of a silicon-containing starting compound.

3. The method according to claim 1, wherein said first particle fraction has a specific BET surface area of at least 40 $m^2/g$.

4. The method according to claim 2, wherein said first particle fraction has a specific BET surface area of at least 40 $m^2/g$.

5. The method according to claim 1, wherein said second particle fraction has a smaller specific BET surface area than said first particle fraction.

6. The method according to claim 5, wherein said second particle fraction has a specific BET surface area of not more than 35 $m^2/g$.

7. The method according to claim 1, wherein said first and said second particle fractions are obtained by granulating nanoscale, amorphous $SiO_2$ primary particles and by subsequent thermal consolidation of the granules.

8. The method according to claim 7, wherein said thermal consolidation is adjusted by sintering said granules at a temperature ranging from 900° C. 1450° C., with the temperature during sintering of said first particle fraction being lower than during sintering of said second particle fraction.

9. The method according to claim 1, wherein said quartz glass grains have a specific BET surface area of not more than 1 $m^2/g$.

10. The method according to claim 1, wherein said particle mixture additionally comprises $SiO_2$ primary particles which have not agglomerated or have only agglomerated to a slight degree and have a specific BET surface area of at least 40 $m^2/g$.

11. The method according to claim b, wherein said $SiO_2$ primary particles which have not agglomerated or have only agglomerated to a slight degree are provided in a suspension.

12. A composite material comprising:
an $SiO_2$-containing matrix having quartz glass grains embedded therein;
said matrix having an $SiO_2$ content of at least 99% by wt.

13. A permanent mold for melting solar silicon, said mold being formed of a composite material according to claim 12.

* * * * *